United States Patent Office 3,452,076
Patented June 24, 1969

3,452,076
CERTAIN FLUORENYL-9-NITRATES
Günther Mohr and Dietrich Erdmann, Darmstadt, Konrad Niethammer, Traisa, and Siegmund Lust and Gerhart Schneider, Darmstadt, Germany, assignors to E. Merck A.G., Darmstadt, Germany
No Drawing. Filed Apr. 7, 1966, Ser. No. 540,846
Claims priority, application Germany, Apr. 10, 1965,
M 64,842
Int. Cl. C07c 77/02; A01n 5/00
U.S. Cl. 260—466  2 Claims

ABSTRACT OF THE DISCLOSURE

As novel compounds exhibiting morpho-regulatory effects such as dwarfing, there are provided 9-nitrato and 9-cyano compounds of the formula

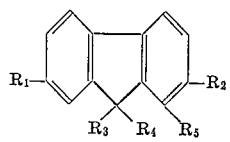

wherein $R_1$ and $R_2$ each represents H or halogen;
$R_3$ represents $ONO_2$ or CN;
$R_4$ represents H, OH, $CH_2OR_6$, or $COOR_6$;
$R_5$ represents H or $COOR_6$; and
$R_6$ represents H or alkyl of 1–4 carbon atoms, with the provision that when $R_1$ and $R_2$ represent H, and $R_3$ represents CN, $R_4$ and $R_5$ represent neither both H, nor $R_4$ OH and $R_5$ carboxylic acid ethyl ester simultaneously.

---

This invention relates to the application of chemicals to plants, and in particular to such chemicals which function as morpho-regulators, i.e., agents which influence plant development in a histological-anatomic and morphological manner.

One object of this invention, therefore, is to provide a method of effecting morpho-regulatory activity in plants.

Another object is to provide compositions in solid or liquid form for effecting morpho-regulatory activity in plants consisting of novel chemical compounds and usual carrier materials.

A still further object is to provide novel chemical compounds and processes for their production.

Upon further study of the specification and appended claims, other objects and advantages of this invention will become apparent.

To attain the objects of this invention, there are provided agents containing one or more fluorene-9-carboxylic acid derivatives of Formula I, as follows:

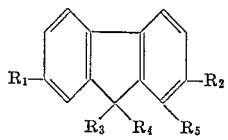

wherein $R_1$ and $R_2$ are identical or different and represent H or halogen;
$R_3$ is CN or $ONO_2$;
$R_4$ is H, OH, $CH_2OR_6$ or $COOR_6$;
$R_5$ is H or $COOR_6$; and
$R_6$ is H or alkyl of 1 to 4 carbon atoms.

These substances can be employed, if desired, in mixture with herbicidally effective and/or growth-regulating substances.

The fluorene-9-carboxylic acid agents of this invention are effective in a plant-morpho regulatory manner which is to be understood as an influencing of the plant development in a histological-anatomical and morphological manner, this influence probably occurring by way of an effect upon cell division and cell determination.

The novel agents are absorbed in the plant and transported therein basipetally and acropetally to the formative tissues (meristems), where they greatly influence the formation of tissues and organs and thus predominantly the new growth of the plant after the treatment.

Particularly, these agents cause the plant, even if used in extraordinarily low concentrations, to dwarf, without toxic side effects.

However, in addition to this general inhibition of development, there were also observed organ regressions, organ metamorphoses, organ deficiencies, and also new formation of organs.

The active substances in the agents according to the invention exhibit their morpho-regulatory effect in extreme dilutions, for example in the range of 0.01 to 100 p.p.m. (parts per million). The active substances are normally only slightly phytotoxic, so that their morpho-regulatory activity extends over a very wide range of concentration.

The deformations caused by the novel agents are observed at various parts of the plant. For example, in leaves and petals there is found a reduction of arrangement of the leaf spread (e.g., feathery leaves are not divided, serrated ones become smooth-edged), often leading to a complete loss of spread (e.g., spreadless stems, leaf stem rudiments) and furthermore suppression of leaf formation as well as leaf transformations or leaf intergrowth. Not infrequently, there is also found an ealier or increased formation of flower buds, and in addition flower-leaf formation and flower perfoliation, as well as premature or also retarded development of other organs. On the sprouting axils of the plants, there have likewise been observed the most varying anomalies in development.

Deviations in development likewise occur at the roots, for example, an increased branching of the roots and/or a thickening of the roots.

Furthermore, numerous other effects can be obtained upon plants with the novel agents of this invention, for example increased formation of chlorophyll, parthenocarpic fruit formation, as well as interruption of the seed rest of plant seeds with endogenic germination delay. The active agents furthermore often influence the water metabolism of plants.

The novel agents according to the invention are thus eminently suited for either a general control or a special regulation of the plant development. Moreover, they are also particularly applicable in combination with herbicidally effective and/or or growth-regulating substances, for combating undesirable plant growth.

Herbicidally effective substances, in this connection, are to be understood as meaning not only the directly phytotoxically effective substances, but also growth-promoting herbicides. Such growth-promoting herbicides are, for example, substituted phenoxyalkane-carboxylic acids and the derivatives thereof, such as 2,4-dichloro-phenoxy-acetic acid, 2-methyl-4-chorophenoxy-acetic acid, 2,4,5-trichlorophenoxy-acetic acid, 2,4-dichlorophenoxy-propionic acid, 2-methyl-4-chlorophenoxy-propionic acid, 2,4,5-trichlorophenoxy-propionic acid, α-(2,4,-dichloro-phenoxy)-butyric acid, α-(2-methyl-4-chlorophenoxy)-butyric acid, as well as the salts and esters thereof; furthermore, substituted benzoic acids and other aryl-carboxylic acids, as well as arylalkane-carboxylic acids, and the derivatives thereof, such as 2,3,5-triiodobenzoic acid, 2,3,6-trichlorobenzoic acid, 2-methoxy-3,6-dichlorobenzoic acid, or 2,3,6-trichlorophenyl-acetic acid; substituted benzonitriles, such as 2,6-dichlorobenzonitrile, 3,5-diiodo-4-hydroxybenzonitrile; aryl-phthalamic acids and the derivatives thereof, such as N-naphthyl-(1)-phthalamic acid. Furthermore suitable are herbicides without any growth-promoting character, for example substituted phenylurea derivatives, such as 3-(p-chlorophenyl)-1,1-dimethyl urea; 3-(3',4'-dichlorophenyl)-1,1-dimethyl urea; N-phenyl-carbamic acids and the derivatives thereof, such as N-phenyl-carbamic acid isopropyl ester and N-3-chloro-phenyl-carbamic acid isopropyl ester; further triazoles and triazines and the derivatives thereof, such as 3-amino-1,2,4-triazole, 2-chloro-4,6-bis-ethylamino-triazine, and 2-chloro-4-isopropylamino-6-ethylamino-triazine, furthermore halogenated fatty acids and derivatives thereof, such as trichloroacetic acid and 2,2-dichloropropionic acid; maleic acid hydrazide and derivatives; furthermore suitable are growth-regulating substances, such as, for example, indole-3-alkane-carboxylic acids, and the derivatives thereof, such as β-indolyl-butyric acid; gibberellin and its derivatives, such as gibberellinic acid (Gibberellin A 3); kinines and their derivatives, such as 6-(L-furfuryl)-aminopurine (kinetine). Furthermore suitable are plant-effective quaternary nitrogen compounds, such as β-chloroethyl-trimethyl-ammonium chloride, (4-hydroxy-5-isopropyl-2-methylphenyl)-trimethyl-ammonium chloride, or [5 - isopropyl - 2 - methyl-4-(piperidino-carbonyloxy)-phenyl]-trimethyl-ammonium chloride; 1,1'-ethylene-2,2'-dipyridinium dibromide, as well as 1,1'-dimethyl-4,4'-dipyridinium-dimethyl sulfate; besides, aryl-boric acids and the derivatives thereof, such as phenyl-boric acid; furthermore distinctive growth stimulants, such as urea and purine derivatives can be used.

For the herbicidal application, such agents are used preferably, in accordance with the invention, which contain, in addition to one or more of the fluorene derivatives of Formula I, substituted in the 9-position, one or more growth-promoting herbicides from the group of the substituted phenoxyalkane-carboxylic acids, or the derivatives thereof. Such compounds are preferably derivatives of the phenoxy-acetic and phenoxy-propionic acid.

Further preferred agents of the invention are such which contain, in addition to the fluorene derivatives of Formula I, 3,5-diiodo-4-hydroxy-benzonitrile.

Advantageously, in the novel agents of the invention, the fluorene derivatives and one or more herbicidally effective and/or one or more growth-regulated substances are contained in a weight proportion of 1:50 to 1:1, preferably 1:9 to 1:3, respectively.

The active substances of the agents according to the invention are, with the exception of a few, previously unknown substances. The only known compounds are the 9-cyano-fluorene, as well as the (1)-ethyl ester of fluorene-9-cyanohydrin-carboxylic acid.

Thus, with respect to novelty, all the 9-nitrates are new. In addition, particularly novel and unobvious 9-cyano-fluorenes are those wherein at least one, preferably at least two of $R_1$, $R_2$, and $R_5$ are not hydrogen. Alternatively, when $R_1$ and $R_2$ are both hydrogen, and $R_3$ is CN, $R_4$ and $R_5$ are neither both hydrogen nor is $R_4$ OH and $R_5$ $COOC_2H_5$; it also being preferred, however, even in this case, that at least one of $R_1$ and $R_2$ be other than hydrogen.

The novel compounds of the present invention are furthermore most valuable intermediate products in the preparation of other fluorene derivatives. Thus, for example those compounds being devoid of substituent(s) in position 2 and/or 7 may be used to produce the corresponding compounds wherein $R_1$ and/or $R_2$ are halogen, such conversion being effected by standard techniques of halogenation.

The compounds wherein $R_3$ means $ONO_2$ may be converted by conventional hydrolysis into the corresponding compounds wherein $R_3$ is a hydroxyl group. Compounds of this type, for example 9-fluorenol-9-carboxylic acid, its esters and the corresponding derivatives halogenated in 2 and/or 7-position are most useful as morpho-regulators or—especially in combination with herbicides—potent herbicides with a wide spectrum of activity.

Compounds wherein $R_3$ means CN may likewise be subjected to hydrolysis, preferably in an acid medium. Thus, in a conventional reaction the corresponding COOH-derivatives are obtained, which, in their turn, are known to be most valuable morpho-regulators, especially when $R_4$ represents H or OH. Of course, they may be further converted into 9-esters or salts, preferably alkali metal or amine salts.

In the following table, preferred compounds of Formula I are illustrated by way of specific R-groups attached to the fluorene nucleus; for example, compound 1 is 9-cyanofluorene.

| Compound No. | $R_1$ | $R_2$ | $R_3$ | $R_4$ | $R_5$ |
|---|---|---|---|---|---|
| 1 | H | H | CN | H | H |
| 2 | H | Cl | CN | H | H |
| 3 | H | Br | CN | H | H |
| 4 | Cl | Cl | CN | H | H |
| 5 | H | H | CN | $CH_2OH$ | H |
| 6 | H | Cl | CN | $CH_2OH$ | H |
| 7 | Cl | Cl | CN | $CH_2OH$ | H |
| 8 | Cl | Cl | CN | $CH_2OCH_3$ | H |
| 9 | H | H | CN | OH | COOH |
| 10 | Cl | H | CN | OH | COOH |
| 11 | H | H | CN | OH | $COOCH_3$ |
| 12 | H | H | CN | OH | $COOC_2H_5$ |
| 13 | H | H | CN | OH | $COOC_4H_9(n)$ |
| 14 | H | H | CN | OH | $COOC_3H_7(iso)$ |
| 15 | H | H | $ONO_2$ | H | H |
| 16 | H | H | $ONO_2$ | $COOCH_3$ | H |
| 17 | H | H | $ONO_2$ | $CH_2OH$ | H |
| 18 | Cl | H | $ONO_2$ | H | H |
| 19 | Br | H | $ONO_2$ | H | H |
| 20 | H | H | $ONO_2$ | H | $COOCH_3$ |
| 21 | H | H | $ONO_2$ | $COOC_2H_5$ | $COOCH_3$ |
| 22 | Cl | Cl | $ONO_2$ | H | H |
| 23 | I | I | $ONO_2$ | H | H |
| 24 | F | F | $ONO_2$ | H | H |
| 25 | I | I | CN | H | H |
| 26 | F | F | CN | H | H |

The new active ingredients are obtained by known processes. Thus, for example, compounds according to Formula I but being substituted by a carboxamide group at position 9 can be treated with dehydrating agents. If desired, the 9-cyano-fluorene derivatives obtained thereby can be reacted with formaldehyde to yield compounds in which $R_4$ denotes $CH_2OH$. Furthermore, the 9-chloro-fluorene-9-carboxylic acid derivatives substituted according to Formula I can be reacted with silver nitrate or a compound of Formula I substituted at position 1 can be reacted with hydrogen cyanide or with cyanides. In such compounds of Formula I in which $R_1$ and/or $R_2$ denote hydrogen, halogen substituents can be introduced at the 2- and/or 7-position by treatment with the corresponding halogens in a manner known per se. In all compounds thus obtained, insofar as $R_6$ denotes H, the hydrogen can be replaced by an alkyl radical with 1–4 carbon atoms by the usual methods.

All the usual dehydrating agents, e.g. phosphorus pentoxide, phosphorus oxychloride, phosphorus pentachloride, thionyl chloride, $NaCl \cdot AlCl_3$ or phthalic acid anhydride, can be used for the dehydration of a compound of Formula I which contains a carboxamide group at 9 position. As solvents, ethylene dichloride, toluene and xylene in particular can be used. Normally the reaction mixture is heated to temperatures between about 80 and 250° for several hours if desired. The reaction mixture is then worked up in the usual manner. It is particularly advantageous to carry out the reaction with an excess of thionylchloride as the by-products obtained are gaseous and in this way the desired nitriles can easily be isolated.

To introduce the group $R_4 = CH_2OH$ the 9-cyano-fluorene derivatives thus obtained are reacted with formaldehyde or agents which yield formaldehyde, e.g., paraformaldehyde, in the presence of basic condensing agents such as benzyltrimethylammonium hydroxide. The reaction is preferably carried out in aqueous-alcoholic solution. The reaction times generally lie between 1 and 6 hours. The reaction product can easily be isolated in the usual manner.

The introduction of the nitrate group is best carried out by reaction with silver nitrate. The corresponding 9-chloro-fluorene-9-carboxylic acids or their esters are suitable starting materials for this reaction. Alcohols dimethylformamide, glycolic acid ester, ethylene glycol or benzene are the solvents preferably used. After intensive, thorough mixing of the reaction mixture the silver chloride is filtered off and the nitroester obtained isolated from the filtrate.

Compounds of Formula I, wherein $R_3$ denotes CN, can furthermore be so prepared that a substituted 9-halogen-fluorene corresponding to Formula I is reacted with hydrogen cyanide or metal cyanides, preferably alkaline cyanides or cuprous cyanide. Not only the preferred 9-chloro-fluorene but also the other halogen compounds, particularly the bromo- and ido compounds can be used in this reaction. The reaction is usually carried out in alcoholic solution by boiling for several hours. The reaction temperatures depend upon the boiling point of the solvent used.

If fluorenone derivatives substituted at position 1 are used as starting material, here too the reaction is carried out with hydrogen cyanide or metal cyanides, preferably alkaline or cuprous cyanides. The reaction with hydrogen cyanide is preferably carried out in ethers, e.g. diethylether, tetrahydrofuran, dioxan or even in other solvents such as $CH_2Cl_2$, benzene or toluene. The reaction, however, can also be carried out without solvent in liquid hydrogen cyanide in the presence of basic catalysts such as pyridine or tert. bases such as dimethylaniline or triethylamine. The reaction mixture is allowed to stand for several hours under ice cooling and then the excess hydrogen cyanide is evaporated.

On the use of cyanides it is advantageous to add small amounts of an acid, particularly of an aliphatic carboxylic acid with 1 to 6 carbon atoms, hydrochloric acid, sulphuric acid or phosphoric acid. Here too the above mentioned ether, $CH_2Cl_2$, benzene or toluene can be used as solvent. Properly the ketone and the acid, dissolved in organic solvent, are added drop by drop to the aqueous solution of the alkaline cyanides. When working up, the two layers are separated, the aqueous layer extracted several times with the same solvent and the purified extracts worked up in the usual manner.

If the halogenation of the compounds of Formula I in which $R_1$ and/or $R_2$ denotes hydrogen is carried out, it can also be carried out under the usual conditions for halogenisations. The reaction takes place in aqueous suspension or in carbon tetrachloride or glacial acetic acid, either by introducing chlorine, bromine or iodine. 1 to 2 halogen atoms are introduced, depending on the reaction temperatures used.

If, in the compounds of Formula I, the substituent $R_6=H$ is converted to an alkyl group all the usual methods known per se are suitable for this. If desired, etherification and esterification can take place simultaneously. The usual alkylation agents are, for example, diazomethane, which is preferably used in ethereal solution, or dialkylsulfates, which are brought to reaction in aqueous-alkaline solution. However, the groups containing hydroxyl can first be reacted with alkali alcoholates, followed by a reaction with alkylhalogenides.

The novel agents of this invention were tested on Galium aparine in accordance with a specific seedling-dropping method which has proven to be extensively specific for recognizing the average development activity. In this test, young plants of Galium aparine in the early seedleaf stage are treated with a droplet of 0.02 ml. per seedleaf of the active agents dissolved or suspended in water (concentration 0.01%). The thus-treated plants are kept in the greenhouse under a long day (about 10 hours) for three weeks, until their evaluation. As development criteria, the following data were taken:

(a) The reduction of the leaf spread.
(b) The inhibition of the longitudinal growth of the axil.

The morphogenetic faulty control increases with the length of the test. The point at which the effectiveness of the novel agents can be determined is in part extremely low.

The active agents can be worked up into all form of preparations usually employed in conjunction with plant protective agents or plant combating agents. Conventional additives and fillers are used for solid preparations, such as, for example, bole, kaolin, bentonite, ground shale, talc, chalk, dolomite, or kieselguhr.

For liquid formulations, preferred solvents are xylene, solvent naphtha, petroleum, acetone, cyclohexane, dimethyl formamide, dimethyl sulfoxide, or aliphatic alcohols. Emusion concentrates produced in this manner can be marketed as such. Before use, the emulsion concentrates are diluted with water in the usual manner. If agents are used containing, as the active substance, substances soluble in water, it is of course possible to employ water as the solvent or diluent for preparing the concentrate. The application can be done by soil treatment in the pre-sowing or pre-germination process, or by plant treatment in the post-germination process, by spraying, pouring, scattering, dusting, or also by rubbing, powdering, injection, infiltration, or soaking of plants or plant parts, such as tubers, bulbs, or seeds, etc.

When the fluorene-9-carboxylic acid derivatives are formulated as emulsion concentrates, it is preferred to use a total content of said active material of 5-9% by weight, preferably 50% by weight. Likewise, when the fluorene-9-carboxylic acid derivatives are combined with herbicidal and/or growth-regulating substances, the total content of active substances ranges within these limits.

Since the agents of the invention exhibit such varied effects when applied to plants, and since they can be used, moreover, in conjunction with the diverse active substances influencing plant growth, a wide variety of applications is indicated.

Thus, the novel agents of this invention are particularly suitable for chemical growth attenuation, i.e., for gently controlling mixed vegetation, at ditch embankments, dams, roadsides, etc. Chemical growth attenuation is also possible with the agents of the invention in all places were a certain ground coverage by plants (shade) must be retained, i.e., where customary herbicides cannot be employed.

The fluorene derivatives of the invention can also be employed for retarding the flowering time in case of flowers, or in orchards and vineyards, for protection against frost damage, for delaying the sprouting, for example, of lettuce, or for influencing the ripening time. The compounds are likewise suitable for improving the fruit formation, for thinning the fruit, and for preventing the premature dropping of the fruit. Furthermore, a promotion of the flower formation, or also seedless fruit (parthenocarpy) can be obtained with the agents of the invention.

The novel agents of the invention can also be employed for various purposes combined with herbicides of all types, or with growth-regulating substances. They can serve, for example, as systematically effective herbicidal agents for keeping down plant growth and/or for destroying such plant growth totally or selectively. Of particular importance, there is obtained in this manner an improvement in the effectiveness of known herbicides against hardy rooted weeds, as well as an improved spectrum in the effectiveness of such herbicides. The excellent effect of the novel agents of the invention is manifest by the fact that it is possible by means of these novel agents to combat dicotyledonous weeds which can hardly be destroyed by the known herbicides, and if at all, only with great difficulties. Such combined agents according to this invention are therefore particularly suitable for combating board-leaved weeds in cultivated areas of useful monocotyledonous plants.

Without further elaboration, it is believed that one skilled in the art can, using the preceding description, utilize the present invention to its fullest extent. The following preferred specific embodiments are, therefore, to be construed as merely illsutrative, and not limitative of the remainder of the specification and claims in any way whatsoever.

A. PRODUCTION OF THE ACTIVE AGENTS

Example 1.—Fluorenone-cyanohydrin-carboxylic acid-1-ethyl-ester 11.8 g. of fluorenone-carboxylic acid-1-ethyl-ester are dissolved in 25 ml. of dimethyl formamide. Under ice cooling, there are added successively 10 ml. of triethylamine, 3.8 g. of sodium cyanide in 10 ml. of water, and 4.5 g. of glacial acetic acid. The reaction mixture is agitated for one hour at room temperature and is then poured into 70 ml. of 2 N hydrochloric acid and ice. The precipitated crystals are vacuum-filtered and dried. For purposes of recrystallization, the substance is dissolved in a small amount of glacial acetic acid and mixed with water until the mixture becomes turbid; M.P. 102–105° C.

Example 2.—Fluorenyl-9-nitrate

A mixture of 20 g. of 9-chlorofluorene, 19.2 g. of silver nitrate, and 50 ml. of glycolic acid ethyl ester is very vigorously agitated for two minutes, the temperature increasing to 40° C. The reaction mixture is diluted with methylene chloride and filtered. The filtrate is washed with sodium bicarbonate solution and water, dried, and distilled off. The residue is crystallized from ethanol or petroleum ether; M.P. 86–87° C.

Example 3.—Fluoren-(9)-yl-nitrate-carboxylic acid-(9)-methyl-ester

Analogously to Example 2, 25.8 g. 9-chlorofluorene-carboxylic acid-9-methyl-ester are reacted with 19.2 g. of silver nitrate in 50 ml. of glycolic acid ethyl ester. There is obtained the fluoren-(9)-yl-nitrate-carboxylic acid-(9)-methyl-ester having the melting point of 102–103° C. (methanol).

Example 4.—Fluorenone-cyanohydrin-carboxylic acid-(1)

10 g. of fluorenone-carboxylic acid-(1) and 5 ml. of triethylamine are dissolved in 30. ml. of dimethyl formamide and mixed with 5 ml. of anhydrous hydrocyanic acid. After 5 minutes, the reaction mixture is concentrated to half the amount, under subatmospheric pressure, and is subsequently poured into 25 ml. of 2 N HCl and ice. The oil which separates crystallizes after a short time. The crystals are vacuum-filtered, ground fine with benzene, and again vacuum-filtered. Thereafter, the reaction product is dissolved in a small quantity of acetone, cleared with charcoal, and then water is added until the crystallization is initiated. When determining the melting point, HCN is split off during heating to 180° C.; subsequently, the melting point of the starting material is obtained (194° C.).

Example 5.—9-cyanofluorene 20 g. of fluorene-9-carboxylic acid are inundated in 100 ml. thionyl chloride and boiled under reflux for 1½ hours. The excess thionyl chloride is removed under vacuum, and the oily residue is taken up in 50 ml. of benzene; then, this residue is introduced, batch-wise, into a benzenic ammonia solution. The precipitated substance is vacuum-filtered after one hour, washed with benzene, and, after drying, mixed intimately with 4 g. of phosphorus pentoxide. The mixture is heated for one hour to 250° C., cooled, and taken up in benzene. The benzenic solution is shaken out with water, dried, and concentrated by evaporation. The remaining residue yields, after recrystallization from cyclohexane, 6 g. (63% of theory) of 9-cyanofluorene, M.P. 150–152° C.

Example 6.—9-hydroxymethyl-9-cyanofluorene 5.5 g. of 9-cyanofluorene in 15 ml. of dimethyl formamide are allowed to stand overnight with 4 g. of an aqueous formalin solution (38% by volume) combined with about 0.5 ml. of a methanolic solution of trimethylbenzyl-ammonium hydroxide; then the reaction mixture is poured onto water, and the precipitating oil is extracted with methylene chloride. After working up and recrystallization from cyclohexane there are obtained 5.2 g. (82% of theory) of 9-hydroxymethyl-9-cyanofluorene, M.P. 99–101° C.

B. PREPARATION OF COMPOSITIONS FOR APPLICATION TO PLANTS

Example 7

| | Percent |
|---|---|
| 9-hydroxymethyl-9-cyanofluorene | 25 |
| Dimethyl formamide | 5 |
| Xylene | 45 |
| Alkylolamine sulfonate | 25 |

Example 8

| | Percent |
|---|---|
| 9-cyanofluorene | 12.5 |
| Xylene | 82.5 |
| Alkylaryl sulfonate+sorbitol polyoxyethylene ether | 5 |

Example 9

| | Percent |
|---|---|
| 2-chloro-9-hydroxymethyl-9-cyanofluorene | 50 |
| Alkyl naphthalene sulfonate | 0.5 |
| Cell pitch (a product from the evaporation of sulfite waste liquor) | 10 |
| Silicic acid | 3 |
| Bole | 36.5 |

Example 10

| | Percent |
|---|---|
| Fluorenone-9-cyanohydrin-carboxylic acid-(1) | 50 |
| Oleic acid-N-methyl-taurine | 10 |
| Silicic acid | 3 |
| Siliceous chalk | 37 |

Example 11

| | G. |
|---|---|
| 2-methyl-4-chlorophenoxy-acetic acid-isooctyl ester | 42 |
| Fluorenyl-9-nitrate | 10 |
| Petroleum | 23 |
| Xylene | 20 |
| Emulsifier | 5 |

Example 12

| | G. |
|---|---|
| 2-methyl-4-chlorophenoxy-acetic acid-isooctyl ester | 42 |
| Fluorenyl-9-nitrate-9-carboxylic acid methyl ester | 3 |
| Polyoxyethylene-sorbitol ester+alkaryl sulfonate | 5 |
| Solvent naphtha | 50 |

Example 13

| | G. |
|---|---|
| 4-chloro-2-methyl-phenoxy-propionic acid butyl glycol ester | 35 |
| 2-chloro-9-hydroxymethyl-9-cyanofluorene | 10 |
| Alkylphenol polyglycol ether | 10 |
| Petroleum | 45 |

Example 14

| | G. |
|---|---|
| 2,4-dichlorophenoxy-acetic acid isopropyl ester | 42 |
| 2,7-dichlorofluorenyl-9-nitrate | 10 |
| Solvent naphtha | 43 |
| Emulsifier | 5 |

Example 15

| | G. |
|---|---|
| Chloromethyl-phenoxy-propionic acid butyl glycol ester | 30 |
| 9-hydroxymethyl-fluorenyl-9-nitrate | 20 |
| Fatty alcohol polyglycol ether | 15 |
| Acetone | 35 |

Example 16

| | G. |
|---|---|
| 2-methyl-4-chlorophenoxy-acetic acid isooctyl ester | 20 |
| Fluorenone-9-cyanohydrin-carboxylic acid-(1)-ethyl ester | 5 |
| Turkey red oil | 25 |
| Dimethyl formamide | 50 |

Example 17

| | Kg. |
|---|---|
| 3,5-diiodo-4-hydroxy-benzonitrile | 50 |
| 9-cyanofluorene | 10 |
| Polyoxyethylene-sorbitol ester + alkylaryl sulfonate | 5 |
| Bole | 35 | are mixed in a crushing mill to form a sprayable powder.

Example 18

A composition according to Example 14 is prepared wherein the 2,7-dichlorofluorenyl-9-nitrate is substituted by one of the following compounds:

2,7-dichloro-9-cyanofluorene;
2,7-diiodo-9-cyanofluorene;
2,7-dibromo-9-cyanofluorene;
2,7-difluoro-9-cyanofluorene;
2,7-diiodo-fluorenyl-9-nitrate;
2,7-dibromo-fluorenyl-9-nitrate;
2,7-difluoro-fluorenyl-9-nitrate.

Example 19

| | Parts |
|---|---|
| 2 - methyl - 4 - chlorophenoxy - acetic acid isooctyl ester | 25 |
| Fluorenone - 9 - cyano - hydrine - carboxylic acid-(1) - propyl ester | 5 |
| Turkey red oil | 20 |
| Dimethyl formamide | 50 | the propyl ester being preferably prepared by esterification according to the standard procedures of the compound of Example 4.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A compound of the formula:

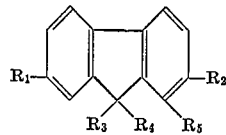

wherein
$R_1$ and $R_2$ each represents H or halogen;
$R_3$ represents $ONO_2$;
$R_4$ represents H, OH, $CH_2OR_6$, or $COOR_6$;
$R_5$ represents H or $COOR_6$; and
$R_6$ represents H or alkyl of 1–4 carbon atoms.

2. A compound as defined by claim 1 wherein said compound is a member of the group consisting of
 (a) fluorenyl-9-nitrate
 (b) fluorenyl-9-nitrate-9-carboxylic acid methyl ester
 (c) 2,7-dichlorofluorenyl-9-nitrate
 (d) 9-hydroxymethyl-fluorenyl-9-nitrate
 (e) 2,7-diiodofluorenyl-9-nitrate
 (f) 2,7-dibromofluorenyl-9-nitrate, and
 (g) 2,7-difluorofluorenyl-9-nitrate.

References Cited

UNITED STATES PATENTS 3,325,544   6/1967   Moffett _____ 260—465 X

OTHER REFERENCES

Ginsberg et al., Journal of American Chemical Society, vol. 71, p. 1500, 1949.

Merck, Chemical Abstracts, volume 62, p. 11086c, 1965.

Merck, Chemical Abstracts, volume 62, p. 16895c, 1965.

LELAND A. SEBASTIAN, Primary Examiner.

U.S. Cl. X.R.

71—79, 105, 107, 112, 115, 122; 260—465